J. D. SHOTWELL.
HEATING ATTACHMENT FOR MOTOR VEHICLES.
APPLICATION FILED JAN. 31, 1921.
1,418,208.
Patented May 30, 1922.
2 SHEETS—SHEET 1.
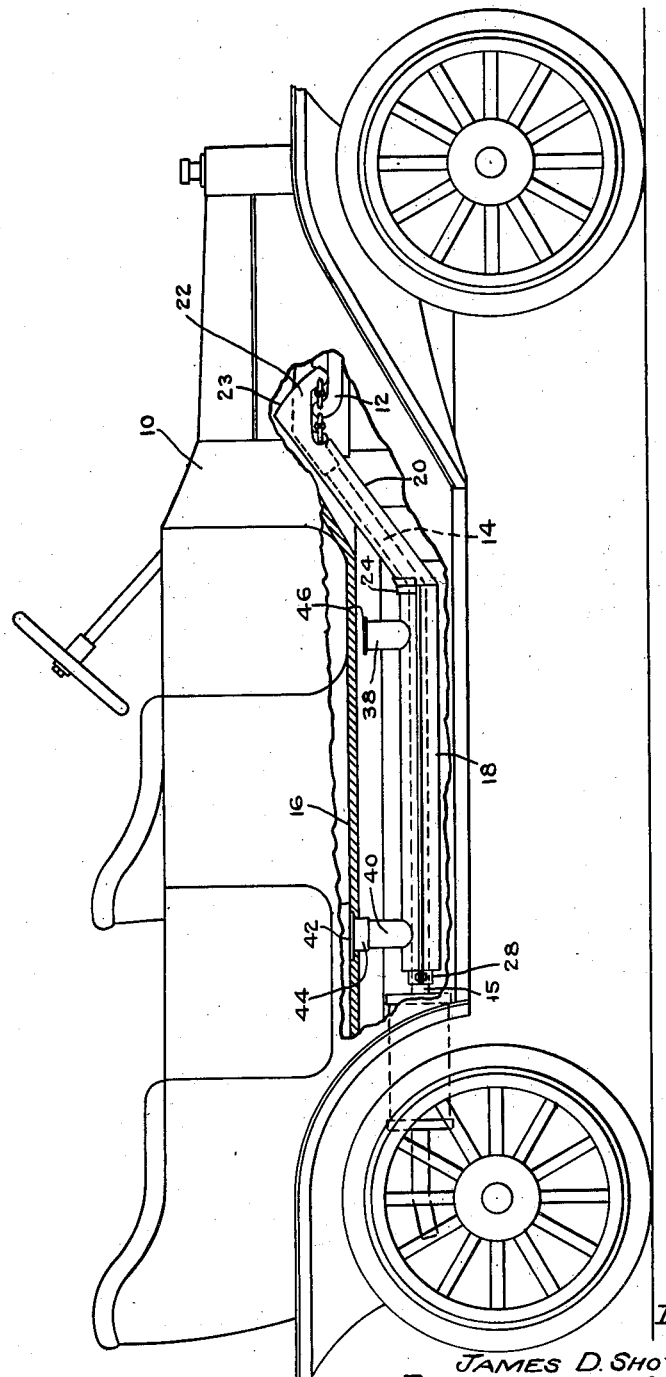
INVENTOR
JAMES D. SHOTWELL.
BY Whiteley and Ruckman
ATTORNEYS.

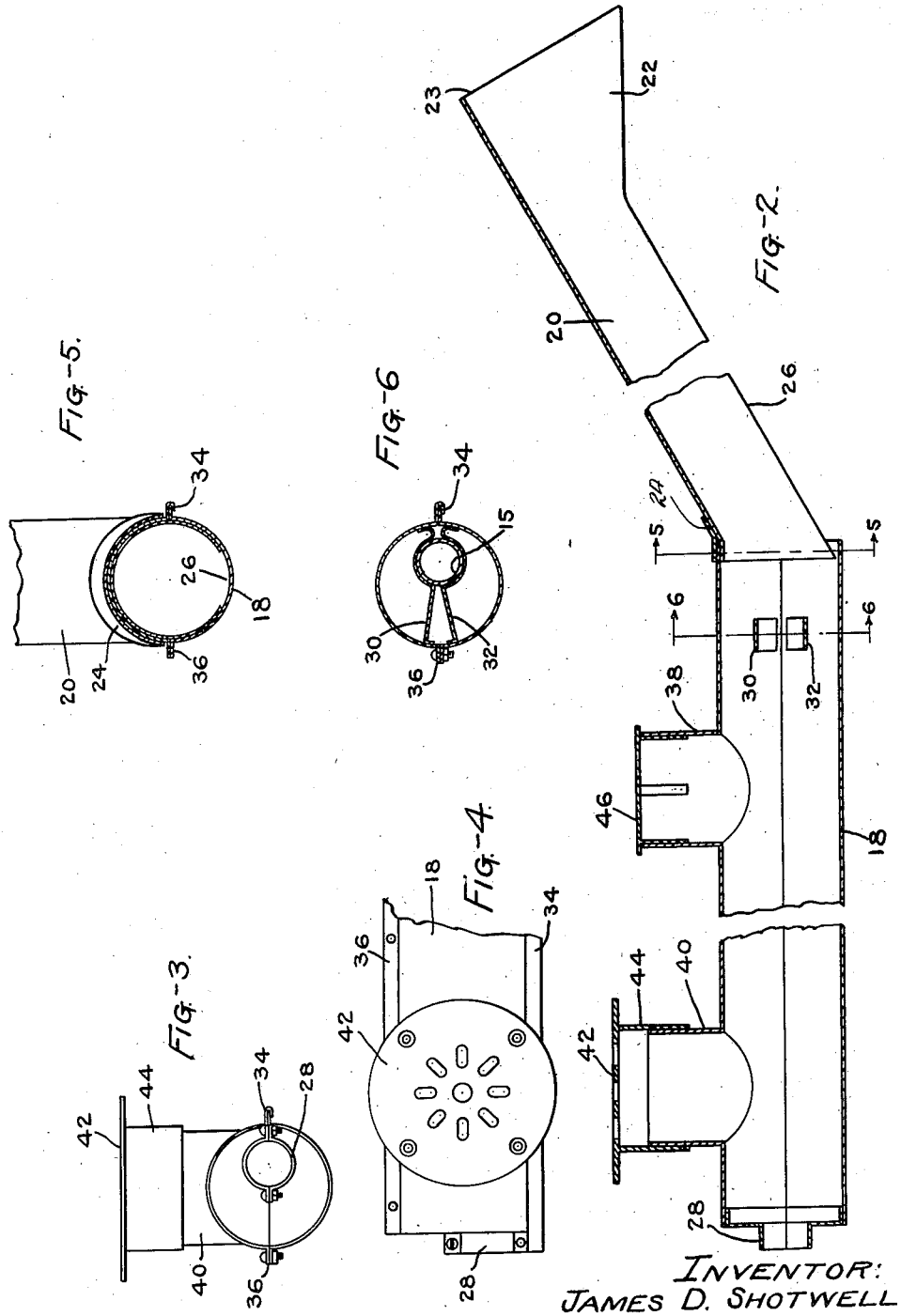

UNITED STATES PATENT OFFICE.

JAMES D. SHOTWELL, OF MINNEAPOLIS, MINNESOTA, ASSIGNOR TO SHOTWELL JOHNSON COMPANY, OF MINNEAPOLIS, MINNESOTA.

HEATING ATTACHMENT FOR MOTOR VEHICLES.

1,418,208.

Specification of Letters Patent.   Patented May 30, 1922.

Application filed January 31, 1921.   Serial No. 441,177.

*To all whom it may concern:*

Be it known that I, JAMES D. SHOTWELL, a citizen of the United States, residing at Minneapolis, in the county of Hennepin and State of Minnesota, have invented certain new and useful Improvements in Heating Attachments for Motor Vehicles, of which the following is a specification.

My invention relates to heating attachments for motor vehicles, and an object is to provide a device for heating the interior of such vehicles with fresh air which has been warmed by contact with the customary exhaust manifold and exhaust pipe of the internal combustion engine which furnishes the motive power. Another object is to provide a casing for conducting the air backwardly from the front of the car and delivering it into the interior thereof, said casing being so constructed that it may be quickly and easily attached to the existing exhaust pipe.

The full objects and advantages of my invention will appear in connection with the detailed statement thereof, and the novel features embodied in my inventive idea will be particularly pointed out in the claims.

In the accompanying drawings which illustrate the application of my invention in one form,—Fig. 1 is a view in side elevation of an automobile with a portion thereof broken away to show my heating attachment applied. Fig. 2 is a view in central longitudinal section of the attachment with intermediate portions broken away. Fig. 3 is a rear elevational view of the attachment. Fig. 4 is a top plan view showing the register with which the attachment is provided. Fig. 5 is a view in section on the line 5—5 of Fig. 2. Fig. 6 is a view in section on the line 6—6 of Fig. 2.

Referring to the construction shown in the drawings, the numeral 10 designates in general any motor vehicle which is provided with a suitable exhaust manifold 12, the exhaust pipe 14, 15 and a floor 16. My attachment is made of sheet metal and is of tubular form so as to provide a casing and comprises a rear section 18 and a front section 20 which are adapted to be connected together in a suitable manner as will hereinafter appear.

The front section at its forward end is made in the form of a hood 22 having an open front end 23 and this hood fits upon the exhaust manifold as shown in Fig. 1, and this section at its rear end is adapted to fit into the front end of the section 18. In order to hold the two sections together, a curved strip 24 secured to the section 20 fits over the section 18, as shown in Fig. 2. For convenience in attaching the front section 20, the same is preferably provided with a gap in the lower side as indicated at 26, in Figs. 2 and 5, and this section is supported by the exhaust manifold and by the forward end of the section 18 so as to enclose the downwardly inclined portion 14 of the exhaust pipe. The rear section 18 encloses a considerable portion of the horizontal part 15 of the exhaust pipe, being held in spaced relation therefrom at the rear by a reduced portion 28 and near the front by a pair of spring arms 30 and 32 secured to the inside of the casing and engaging the top and bottom of the exhaust pipe. In the embodiment shown, the opening in the reduced portion 28 and the curvature of the arms 30 and 32 are so disposed that the exhaust pipe extends eccentrically through the section 18 whereby this section is brought inwardly from the side of the car which carries the exhaust pipe. In this manner, provision is made for applying the attachment having regard both for the downward inclination of the exhaust pipe and the customary lateral bend therein. As shown in Figs. 3, 5, and 6, the section 18 is made in two parts having interlocking flanges 34 on one side and straight flanges 36 on the other side, these latter flanges being secured together by bolts. As previously stated the spring arms 30 and 32 are secured to the inside of the casing and as shown in Figs. 2 and 6 the spring arm 30 is secured to the upper part and the spring arm 32 to the lower part of the divided section 18 of the casing, these spring arms both bowed to fit upon the exhaust pipe. The section 18 is provided with one or more branches such as 38 and 40 which extend upwardly when the attachment is in place on the vehicle. In the embodiment shown, there are two of these branches, the branch 40 being shown provided with a register 42 having an annular flange 44 adapted to telescope with the branch 40 so that as shown in Fig. 1, the flange 44 may extend through an opening in the floor with the register flush with the floor. When it is not desired to use a branch such as the branch 38 for heating purposes, it may be closed by a cover or plate 46 held in place in any suitable manner. It is, therefore, an easy matter to provide a register for the space in front of both seats or for the space in front of the rear seat only and the attachment may be used equally well in connection with a motor vehicle having a single seat.

The operation and advantages of my invention will be readily apparent from the foregoing description. The movement of the vehicle and the action of the customary fan cause a current of fresh air to pass into the open front end 23 of the hood. This air is heated by radiation from the exhaust pipe and passes up through the registers so that the fresh heated air is constantly supplied in front of the seats in the vehicle. On account of the attachment being made in two sections which may be readily connected together at the proper angle, and further on account of the rear section being made in two parts which may be readily secured together, my attachment may be quickly and easily applied to various types of motor vehicles and will serve to furnish the occupants thereof with a constant supply of freshly heated air. When it is not desired to use the attachment in warm weather, it may be readily removed entirely from the motor vehicle or the registers may be removed and the openings in the floor may be closed in suitable manner.

I claim:

1. A heating attachment for motor vehicles comprising a casing for surrounding the exhaust pipe thereof, said casing having a fresh air opening at its forward end and at its rear portion being in two longitudinally divided parts, means for securing said divided parts together, a pair of transverse spring arms secured respectively to said divided parts, and adapted to fit upon the exhaust pipe, a branch pipe extending upwardly from said casing and a register for the vehicle floor attached to said branch pipe.

2. A heating attachment for motor vehicles comprising a casing for surrounding the exhaust pipe thereof, said casing having a fresh air opening at its forward end and at its rear portion being in longitudinally divided parts reduced at their rear ends so as to form an eccentrically positioned opening for receiving the exhaust pipe, means for securing said divided parts together, a pair of transverse spring arms secured respectively to said divided parts and bowed in such manner as to hold the latter in eccentrically spaced relation around the exhaust pipe, a branch pipe extending upwardly from said casing, and a register for the vehicle floor attached to said branch pipe.

3. A heating attachment for motor vehicles comprising a casing for surrounding the horizontal and inclined portion of the exhaust pipe thereof, said casing consisting of a front section and a rear section, said rear section being in two longitudinally divided parts, means for securing said divided parts in spaced relation around the horizontal portion of the exhaust pipe, an open ended hood on the front part of said front section for resting upon the exhaust manifold, the lower side of said front section being provided with a gap which permits said section to be placed around the inclined portion of the exhaust pipe, a branch pipe extending upwardly from said rear section, and a register for the vehicle floor attached to said branch pipe.

In testimony whereof I hereunto affix my signature.

JAMES D. SHOTWELL.